United States Patent
Li et al.

(10) Patent No.: US 11,386,352 B2
(45) Date of Patent: Jul. 12, 2022

(54) SYSTEM AND METHOD OF TRAINING BEHAVIOR LABELING MODEL

(71) Applicant: Acer Cyber Security Incorporated, Taipei (TW)

(72) Inventors: Chun-Hsien Li, New Taipei (TW); Yin-Hsong Hsu, New Taipei (TW); Chien-Hung Li, New Taipei (TW); Tsung-Hsien Tsai, New Taipei (TW); Chiung-Ying Huang, Taipei (TW); Ming-Kung Sun, Taipei (TW); Zong-Cyuan Jhang, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 398 days.

(21) Appl. No.: 16/286,571

(22) Filed: Feb. 26, 2019

(65) Prior Publication Data
US 2020/0134504 A1 Apr. 30, 2020

(30) Foreign Application Priority Data
Oct. 29, 2018 (TW) ................. 107138219

(51) Int. Cl.
*G06N 20/00* (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

2018/0198812 A1 7/2018 Christodorescu et al.

FOREIGN PATENT DOCUMENTS

| CN | 101782976 | 7/2010 |
|---|---|---|
| CN | 102054016 | 5/2011 |
| CN | 106250986 | 12/2016 |

(Continued)

OTHER PUBLICATIONS

Monowar H. Bhuyan, D. K. Bhattacharyya, and J. K. Kalita. Network Anomaly Detection: Methods, Systems and Tools. 2014. IEEE (Year: 2014).*

(Continued)

*Primary Examiner* — David R Vincent
(74) *Attorney, Agent, or Firm* — JCIPRNET

(57) ABSTRACT

A system of training behavior labeling model is provided. Specifically, a processing unit inputs each data of a training data set into a plurality of learning modules to establish a plurality of labeling models. The processing unit obtains a plurality of second labeling information corresponding to each data of a verification data set and generates a behavior labeling result according to the second labeling information corresponding to each data of the verification data set. The processing unit obtains a labeling change value according to the behavior labeling result and first labeling information corresponding to each data of the verification data set. The processing unit, if determining that the labeling change value is greater than a change threshold, updates the first labeling information according to the behavior labeling results, exchanges the training data set and the verification data set and reestablishes the labeling models.

14 Claims, 5 Drawing Sheets

(56) References Cited

FOREIGN PATENT DOCUMENTS

| CN | 107291911 | 10/2017 | | |
|---|---|---|---|---|
| CN | 108512827 | 9/2018 | | |
| CN | 108780480 | 11/2018 | | |
| EP | 3101599 | 12/2016 | | |
| TW | 201115371 | 5/2011 | | |
| TW | 201735669 | 10/2017 | | |
| TW | 201830929 | 8/2018 | | |
| WO | WO-2017037443 A1 * | 3/2017 | ............... | G06N 3/04 |

OTHER PUBLICATIONS

Funda Güneş, Russ Wolfinger, and Pei-Yi Tan. Stacked Ensemble Models for Improved Prediction Accuracy. 2017. SAS (Year: 2017).*

Office Action of China Counterpart Application, dated Nov. 3, 2021, pp. 1-9.

Liu Kang, "Hyperspectral Sensing Image Classification Technology Based on Active Learning", doctorial dissertation, CUMT, Jun. 2014, pp. 1-110.

G Change a Way of Living, "Machine learning (semi-supervised learning)", Mar. 22, 2018, Available at: https://blog.csdn.net/weixin_40355324/article/details/79650725.

* cited by examiner

SYSTEM AND METHOD OF TRAINING BEHAVIOR LABELING MODEL

CROSS-REFERENCE TO RELATED APPLICATION

This application claims the priority benefit of Taiwan application serial no. 107138219, filed on Oct. 29, 2018. The entirety of the above-mentioned patent application is hereby incorporated by reference herein and made a part of this specification.

BACKGROUND

Field of the Disclosure

The disclosure is directed to an information processing technique and more particularly, to a method and a system of training behavior labeling model.

Description of Related Art

In the digital times with well-developed networks nowadays, information security has become an important issue. Particularly, for businesses, internal documents involve with important business secrets and therefore, leakage of the data or information will result in unrecoverable damages to companies. Thus, companies are all enthusiastic at adopting strict data control and protection measures to avoid the data leakage by, for example, setting accessing authorities for every person, setting up a firewall between the company's internal network and the external network and so on.

Nevertheless, it is necessary for employees to access confidential data when proceeding various business tasks. Even though strict security measures are adopted, and strict accessing standards are set, it is still difficult to protect data from being stolen by the employees who have the intent of doing so. Thus, how to monitor abnormal login behavior of in-house employees is a subject that people having ordinary skills in the art to make effort to.

SUMMARY

The disclosure provides a system and a method of training behavior labeling model capable of training reliable labeling models, so as to monitor abnormal login behavior of in-house employees through the labeling models.

In an embodiment of the disclosure, a system of training behavior labeling model includes an input unit, a storage unit and a processing unit. The input unit receives a labeled data set. The labeled data set has a training data set and a verification data set, and each data of the training data set and each data of the verification data set respectively include first labeling information. The storage unit stores a plurality of learning modules. The processing unit is connected to the input unit and the storage unit and respectively inputs each data of the training data set to a plurality of learning modules to establish a plurality of labeling models. The processing unit further obtains a plurality of second labeling information corresponding to each data of the verification data set respectively according to the labeling models and respectively generates a behavior labeling result corresponding to each data of the verification data set according to the second labeling information corresponding to each data of the verification data set. The processing unit further obtains a labeling change value according to the behavior labeling result and the first labeling information corresponding to each data of the verification data set and determines whether the labeling change value is greater than a change threshold. When the labeling change value is greater than the change threshold, the processing unit updates the first labeling information corresponding to each data of the verification data set according to the behavior labeling results, exchanges the training data set and the verification data set and reestablishes the labeling models according to the exchanged training data set.

In an embodiment of the disclosure, a method of training behavior labeling model includes the following steps: receiving a labeled data set, wherein the labeled data set includes a training data set and a verification data set, and each data of the training data set and each data of the verification data set respectively have first labeling information; respectively inputting each data of the training data set to a plurality of learning modules to establish a plurality of labeling models; respectively obtaining a plurality of second labeling information corresponding to each data of the verification data set according to the labeling models; respectively generating a behavior labeling result corresponding to each data of the verification data set according to the second labeling information corresponding to each data of the verification data set; obtaining a labeling change value according to the behavior labeling result and the first labeling information corresponding to each data of the verification data set and determining whether the labeling change value is greater than a change threshold; and when the labeling change value is greater than the change threshold, updating the first labeling information corresponding to each data of the verification data set according to the behavior labeling results, exchanging the training data set and verification data set and reestablishing the labeling models according to the exchanged training data set.

To sum up, the method and the system of training behavior labeling model of the disclosure can establish the labeling models to automatically label the users' login records. Moreover, in the consideration of the reliability of the labeling models, the method and the system of training behavior labeling model of the disclosure can simultaneously train various labeling models and label the users' login records in a majority decision manner when conflicts occurs to the labeled contents, so as to re-adjust and re-train labeling models. In this way, the method and the system of training behavior labeling model can contribute to enhancing the reliability of the labeling models. Meanwhile, through the labeling models, the users' login records can be automatically observed and analyzed, so as to further identify any possible abnormal login behavior.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In order to monitor malicious data accessing behavior of in-house employees, a management system mostly records users' login records, for example, but not limited to, user identities, login times and corresponding internet addresses. However, the management system records each login record of each user, of which a data amount is quite large. In a case where a user's abnormal behavior is determined in a manual manner, it is difficult to distinguish whether it is normal and abnormal, which consumes much manpower. Accordingly, the disclosure provides a system and a method of training behavior labeling model for learning and training according to the users' login records during a period of time by adopting a machine learning manner, thereby automatically labeling abnormal behavior of the users.

Figure 1:
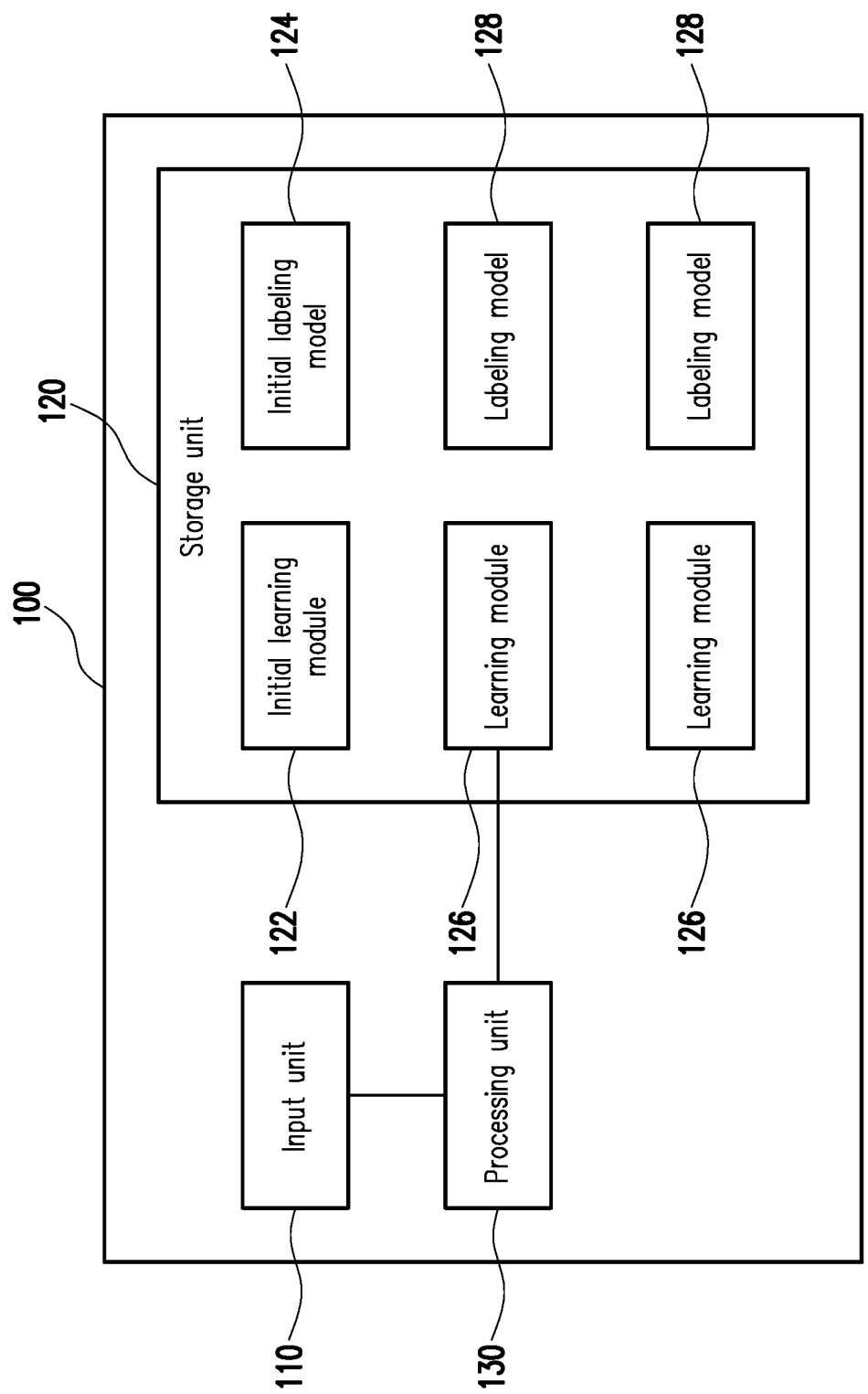
FIG. 1 is a schematic diagram illustrating a system of training behavior labeling model according to an embodiment of the disclosure.

FIG. 1 is a schematic diagram illustrating a system of training behavior labeling model according to an embodiment of the disclosure. In the present embodiment, an application scenario is that, for example, an information manager creates a plurality of sub-accounts in a Windows environment developed by Microsoft Corporation and all login behavior of each sub-account is recorded in a system log to serve as users' login records. The system of training behavior labeling model 100 first labels users' behavior according the login records thereof within a period of time, thereby establishing a behavior model for long-term analysis and observation of the login behavior of the users according to the behavior model. In other embodiments, the users' login records in a system log of Linux, macOS or other various operation systems or the users' login records recorded by programs self-built by the information manager may be used, and the disclosure is not limited thereto.

Referring to FIG. 1, in the present embodiment, the system of training behavior labeling model 100 has an input unit 110, a storage unit 120 and a processing unit 130.

The input unit 110 is configured to receive various information. Particularly, the input unit 110 receives a plurality of users' login records.

In the embodiments of the disclosure, the input unit 110 may use a physical input element, for example, a keyboard, a mouse, a touch screen and so on. Or, alternatively, the input unit 110 may directly receive data imported from other systems via a universal serial bus (USB), a serial port and so on. Moreover, in a networking environment, the input unit 110 may be any type of communication chip, for example, a Bluetooth chip, a WiFi chip or a wired network connection port. The type of the input unit 110 and the manner of information reception thereof are not limited in the disclosure.

The storage unit 120 is configured to store essential program codes and information for operating the system of training behavior labeling model 100. In the present embodiment, the storage unit 120 stores an initial learning module 122, an initial labeling model 124, learning modules 126 and labeling models 128. The initial learning module 122 and the learning modules 126 are trained in a machine learning manner according to the login records to respectively generate the initial labeling model 124 and the labeling models 128 corresponding to behavior of users. Details related to how to generate the initial labeling model 124 and the labeling models 128 will be described below. However, it should be mentioned that even though the numbers of the learning modules 126 and the labeling models 128 illustrated in FIG. 1 are 2, respectively, in other embodiments, the numbers of the learning modules 126 and the labeling models 128 may be more, and FIG. 1 is merely an example for illustration.

In the present embodiment, the storage unit 120 may be any type of fixed or movable random access memory (RAM), read-only memory (ROM), flash memory, hard disk drive (HDD), solid state drive (SSD) or the like element or a combination of the aforementioned elements, and the disclosure is not limited thereto.

The processing unit 130 is connected to the input unit 110 and the storage unit 120 and is configured to execute essential functions of the system of training behavior labeling model 100. Particularly, the processing unit 130 reads and executes the initial learning module 122 and the learning module 124, and details related thereto will be described below. The processing unit 130 may be a central processing unit (CPU), or other programmable general purpose or special purpose microprocessor, digital signal processor (DSP), programmable controller, application specific integrated circuit (ASIC) or other similar devices or a combination of the above devices, but the disclosure is not limited thereto.

Figure 2:
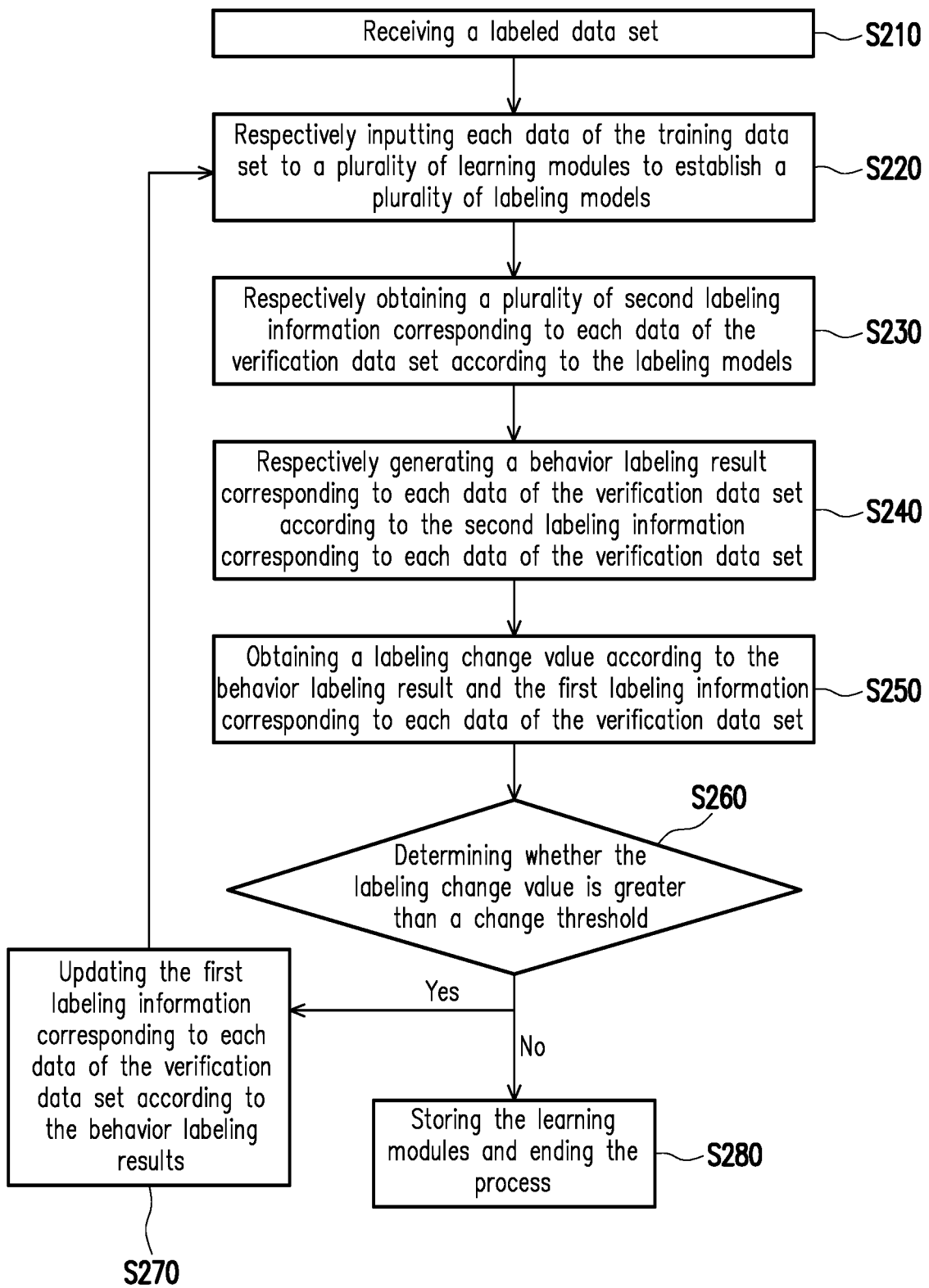
FIG. 2 is a flowchart illustrating a method of training behavior model according to an embodiment of the disclosure.

FIG. 2 is a flowchart illustrating a method of training behavior labeling model according to an embodiment of the disclosure. In the present embodiment, the method is, for example, adapted to the system of training behavior labeling model 100 illustrated in FIG. 1, but the disclosure is not limited thereto. The process flow of the method of training behavior model will be described below with reference to FIG. 1 with FIG. 2.

In step S210, the processing unit 130 receives a labeled data set through the input unit 110. In the present embodiment, the labeled data set includes a plurality of login records of users during a period of time, and each of the login records already has first labeling information. The first labeling information is a label corresponding to a user behavior, which indicates whether the behavior is normal or abnormal, for example. In addition, the processing unit 130 divides the labeled data set into a training data set and a verification data set by a random sampling manner.

In step S220, the processing unit 130 respectively inputs each data of the training data set to a plurality of learning modules 126 to establish a plurality of labeling models 128. In the embodiments of the disclosure, an algorithm adopted by each of the learning modules 126 is a supervised training algorithm, which establishes the labeling models 128 according to the labeled data set that has been labeled, and thus, the number of learning modules 126 corresponds to the number of the labeling models 128, but the numbers of both are not limited in the disclosure. The supervised training algorithm may be, for example, a support vector machine (SVM) algorithm, a logistic regression algorithm, a random forest algorithm, an artificial neural network (ANN) algorithm, a naive Bayes classifier algorithm, a decision tree algorithm, a k-nearest neighbors algorithm, a linear regression algorithm, a relevance vector machine (RVM) algorithm, a perceptron algorithm or other learning algorithms which aim at the similar goal. It is to be mentioned that in order to enhance reliability of the labeling of the learning modules, each the learning modules 126 used in the present embodiment adopts different supervised training algorithms. Thus, even though the processing unit 130 drops the same data respectively to different learning modules 126, the labeling models 128 which are generated through different computations vary with one another.

In step S230, the processing unit 130 obtains a plurality of second labeling information corresponding to each data of the verification data set according to the labeling models 128. In the present embodiment, the processing unit 130 relabels each data of the verification data set according to the labeling models 128 trained by the training data set, and the relabeled results thereof are the second labeling information. It is to be mentioned that in the present embodiment, because each of the second labeling information is the labeling model 128 trained through the first labeling information in the training data set for relabeling the verification data set. Namely, the type of the second labeling information is also a label corresponding to the user behavior and corresponds to the first labeling information. For example, the type of second labeling information is expressed by a classification type, for example, a "normal" type or an "abnormal" type. Or, alternatively, in an embodiment, the type of the second labeling information may also be expressed by a probability, for example, a "probability of normality" or a "probability of abnormality", and the disclosure is not limited thereto. In addition, because the present embodiment provides the plurality of learning modules 126, and each data of the verification data set generates the second labeling information according to each of the labeling models 128. Namely, each data of the verification data set has the second labeling information corresponding to the number of the labeling models 128.

In step S240, the processing unit 130 generates a behavior labeling result corresponding to each data of the verification data set according to the second labeling information corresponding to each data of the verification data set. In an embodiment of the disclosure, the processing unit 130 adopts a majority decision manner, i.e., determines the number corresponding to normal labels and the number corresponding to abnormal labels in the second labeling information corresponding to each data of the verification data set and generates the behavior labeling results according to the majority of the number corresponding to the normal labels and the number corresponding to the abnormal labels. In another embodiment of the disclosure, the processing unit 130 assigns the second labeling information corresponding to each of the different labeling models 128 with a weight, converts the normal labels and the abnormal labels into binarized values and generates the behavior labeling results based on the weights and the corresponding values. In another embodiment of the disclosure, if the type of each of the second labeling information is expressed by the "probability of normality" or the "probability of abnormality", the processing unit 130 may obtain the behavior labeling results by calculating a sum of the probabilities, an average of the probabilities, a weighted sum, a weighted average or other manners. In yet another embodiment of the disclosure, if a part of the types of the second labeling information are expressed by classification values, while the other part of the types of the second labeling information are expressed by probability values, the processing unit 130 may further convert the probability values into the classification values according to the values of the probabilities. In this way, the processing unit 130 may further obtain the behavior labeling results through the number corresponding to the normal labels and the number corresponding to the abnormal labels, which is not limited in the disclosure.

In step S250, the processing unit 130 obtains a labeling change value according to the behavior labeling result and the first labeling information corresponding to each data of the verification data set. Specifically, the processing unit 130 obtains a first number and a second number. The first number is a number of the data which the behavior labeling results and the first labeling information are normal in the verification data set. The second number is a number of the data which the behavior labeling result and the first labeling information are abnormal in the verification data set. To be specific, if the label of the labeled data set received by the processing unit 130 is normal (or abnormal), and the second labeling information generated by training the labeling models 128 and according to the labeling models 128 is also normal (or abnormal), it represents that the contents determined by the labeling models 128 meet an original labeling result, and the determination results of this data are correct in comparison with the first labeling information. In this way, the processing unit 130 may further obtain a measurement value of accuracy according to a ratio of a sum of the first number and the second number to a data amount of the verification data set, which represents a degree of accuracy among all data in the verification data set in comparison with the first labeling information. In addition, the processing unit 130 may also obtain a measurement value of specificity according to a ratio of the first number to the number of the first labeling information which is normal, which refers to, among all the data in the verification data set, how much a degree that a normal user is not misjudged is. Additionally, the processing unit 130 may further obtain a measurement value of sensitivity according to a ratio of the second number to the number of the first labeling information which is abnormal, which refers to a sensitivity degree with respect to the users with abnormal behavior in the verification data set.

In addition, the processing unit 130 also obtains the labeling change value by respectively determining difference values respectively between the measurement value of accuracy, the measurement value of specificity and the measurement value of sensitivity and a historic measurement value of accuracy, a historic measurement value of specificity and a historic measurement value of sensitivity of a previous measurement. It is to be mentioned that if the labeled data set is initially input, and a labeling model 128 is initially established, the historic measurement value of accuracy, the historic measurement value of specificity and the historic measurement value of sensitivity are set to 0 by default, but the disclosure is not limited thereto. In an embodiment of the disclosure, the processing unit 130 may also consider absolute values of the difference values respectively between the measurement value of accuracy, the measurement value of specificity and the measurement value of sensitivity and the historic measurement value of accuracy, the historic measurement value of specificity and the historic measurement value of sensitivity of the previously measurement as labeling change values of different types, or employ an average or a median of the difference values as an overall labeling change value, but the disclosure is also not limited thereto.

In step S260, the processing unit 130 determines whether the labeling change value is greater than a change threshold. If the change value is greater than the change threshold, it represents that the results labeled by the labeling models 128 are still unstable and require to be adjusted, and thus, the process flow jumps to step S270.

In step S270, the processing unit 130 updates the first labeling information corresponding to each data of the verification data according to the behavior labeling results. Further, the processing unit 130 also exchanges the training data set and the verification data set and reestablishes the labeling models according to the exchanged training data set. Namely, the processing unit 130 serves the updated first labeling information corresponding to each data of the verification data set as the exchanged training data set, establishes the labeling models 128 according to the exchanged training data set (i.e., returns to step S220) and verifies the labeling models 128 by using the exchanged verification data set (i.e., performs step S230 to step S260).

However, if in step S260, determining that the labeling change value is not greater than change threshold, it indicates that the results labeled by the labeling models 128 present a stable state, the processing unit 130 updates the first labeling information corresponding to each data of the verification data set according to the behavior labeling results and jumps to step S280.

In step S280, the processing unit 130 stores the labeling models 128 in the storage unit 120 and ends the process.

Figure 3:
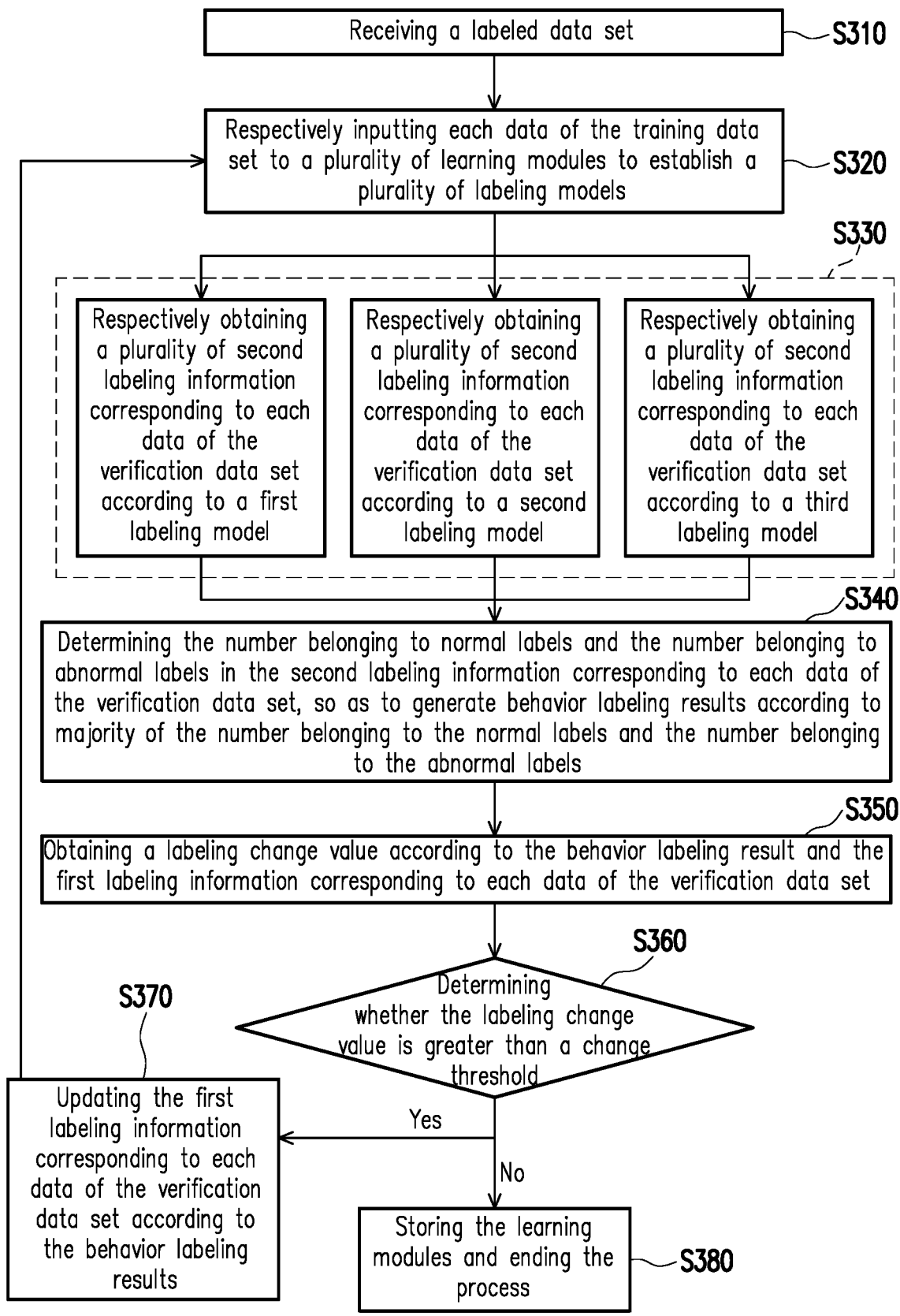
FIG. 3 is a detailed flowchart illustrating a method of training behavior model according to an embodiment of the disclosure.

FIG. 3 is a detailed flowchart illustrating a method of training behavior model according to an embodiment of the disclosure. In the present embodiment, it is, for example, adapted to the system of training behavior labeling model 100 illustrated in FIG. 1, the implementation processes illustrated in FIG. 2 and FIG. 3 may be compliable to each other, but the disclosure is not limited thereto. Details of the method of training behavior model will be described by jointly using FIG. 3 and a case.

This case uses login records of User 1 and User 2 during a period of time between the date of 2018-05-04 and the date of 2018-05-27. Referring to Table 1, Table 1 merely records data in the labeled data set which is selected as data in the verification data set.

ing modules. The first learning module establishes the first labeling model by using a random forest algorithm in combination with various classifiers. The second learning module establishes the second labeling model by using a conventional statistic logistic regression algorithm. The third learning module establishes the third learning module by using an SVM algorithm.

In step S330, the processing unit 130 respectively inputs each data of the verification data set to the first labeling model, the second labeling model and the third labeling model. Referring to Table 1, each data of the verification data set includes the second labeling information corresponding to the first labeling model, the second labeling model and the third labeling model. Taking the first piece of data which records that User 1 logins on the date of 2018-05-14 as an example, the second labeling information generated according to the first labeling model, the second labeling model and the third labeling model is Abnormal, Abnormal and Abnormal, respectively.

In step S340, the processing unit 130 determines the number belonging to normal labels and the number belonging to abnormal labels in the second labeling information corresponding to each data of the verification data set, so as to generate behavior labeling results according to the majority of the number belonging to the normal labels and the number belonging to the abnormal labels. Continuously taking the first piece of data as an example, in the second labeling information of the first piece of data, the number belonging to the normal labels is 0, and the number belonging to the abnormal labels is 3. Namely, the number belonging to the abnormal labels is greater than the number belonging to the normal labels, the processing unit 130 accordingly generates a behavior labeling result corresponding to the first piece of data as Abnormal. Further, taking the second piece of data of the verification data set in Table 1 for example, in the second labeling information, the number belonging to the normal labels is 1, the number belonging to the abnormal labels is 2, and the processing unit 130

TABLE 1

Data in the labeled data set selected as data in the verification data set

| | | | Second labeling information | | | |
|---|---|---|---|---|---|---|
| User | Login date | First labeling information | First labeling model | Second labeling model | Third labeling model | Behavior labeling result |
| 1 | 2018 May 14 | Abnormal | Abnormal | Abnormal | Abnormal | Abnormal |
| 1 | 2018 May 21 | Normal | Abnormal | Abnormal | Normal | Abnormal |
| 1 | 2018 May 26 | Normal | Normal | Normal | Normal | Normal |
| 1 | 2018 May 27 | Normal | Normal | Normal | Abnormal | Normal |
| 2 | 2018 May 04 | Abnormal | Normal | Normal | Normal | Normal |
| 2 | 2018 May 11 | Normal | Abnormal | Normal | Normal | Normal |
| 2 | 2018 May 19 | Normal | Normal | Abnormal | Normal | Normal |
| 2 | 2018 May 26 | Abnormal | Normal | Normal | Normal | Normal |

In step S310, regarding the labeled data set received by the processing unit 130, the data of the verification data set recorded in Table 1 is taken as an example, where each data at least records an identity (for example, including a user identity code, an employee number, an internet location, a device identification code and so on), a login date and the first labeling information of a user.

In step S320, where the processing unit 130 inputs each data of the training data set to a plurality of learning modules to establish a plurality of labeling models, three labeling models are respectively established according to three learnaccordingly determines that the number belonging to the abnormal labels is more than the number belonging to the normal label and a behavior labeling result corresponding to the second piece of data as Abnormal. By deducing by analogy in this way, the rest of the behavior labeling results may be obtained with reference to Table 1 and thus, will not be repeatedly described.

In step S350, a labeling change value is obtained according to the behavior labeling result and the first labeling information corresponding to each data of the verification data set. Specifically, in Table 1, a first number (i.e., a total number of the first labeling information and the behavior labeling results which are Normal) is 4, and a second number (i.e., a total number of the first labeling information and the behavior labeling results which are Abnormal) is 1. The processing unit 130 further obtains a measurement value of accuracy that is 0.625 according to a ratio of a sum of the first number and the second number (which is 5) to a data amount of the verification data set (which is 8). The processing unit 130 also obtains a measurement value of specificity that is 0.8 according to a ratio of the first number (which is 4) to the number of the first labeling information which is Normal (which is 5). The processing unit 130 further obtains a measurement value of sensitivity that is 0.333 according to a ratio of the second number (which is 1) to the first labeling information which is Abnormal (which is 3).

In addition, the processing unit 130 further obtains the labeling change value by determining difference values respectively between the measurement value of accuracy, the measurement value of specificity and the measurement value of sensitivity and a historic measurement value of accuracy, a historic measurement value of specificity and a historic measurement value of sensitivity of a previous measurement. For example, if the historic measurement value of accuracy, the historic measurement value of specificity and the historic measurement value of sensitivity are 0.52, 0.705 and 0.465, respectively, the processing unit 130 may accordingly obtains the difference values that are −0.105, 0.132 and −0.095. In the present embodiment, the processing unit 130 further calculate an average of absolute values of the difference values to serve as the labeling change value, i.e., the labeling change value is about 0.111.

In step S360, the processing unit 130 determines whether the labeling change value is greater than a change threshold. In the present embodiment, the change threshold is 0.001, for example. Thus, the processing unit 130 determines that the change value, 0.111, is greater than the change threshold, 0.001 and thus, jumps to step S370.

In step S370, the processing unit 130 updates the first labeling information corresponding to each data of the verification data set according to the behavior labeling results. Namely, in the case demonstrated by Table 1, the first labeling information corresponding to each of the 8 pieces of data after being updated is Abnormal, Abnormal, Normal, Normal, Normal, Normal, Normal and Normal. In addition, the 8 pieces of data are exchanged with the data of the training data set, namely, the 8 pieces of data are changed from the data of the verification data set to the data of the training data set, thereby retraining the labeling models by using the 8 pieces of data.

The processing unit 130 re-performs step S320 to step S360 until the processing unit 130 determines that the labeling change value is not greater than the change threshold, then stores the labeling models 128 and ends the process flow.

Figure 4:
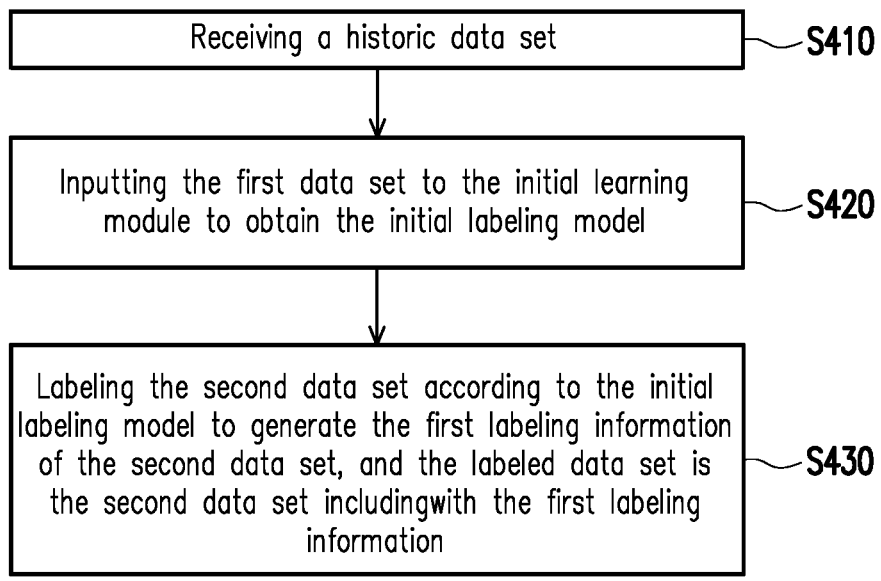
FIG. 4 is a flowchart illustrating a method of training behavior model according to an embodiment of the disclosure.

FIG. 4 is a flowchart illustrating a method of training behavior model according to an embodiment of the disclosure. Referring to FIG. 4, the embodiment illustrated in FIG. 4 is at least adapted to the system of training behavior labeling model of the embodiment illustrated in FIG. 1, but the disclosure is not limited thereto. Details related to how to generate the labeled data set will be described below with reference to FIG. 4 and FIG. 1.

In step S410, the processing unit 130 receives a historic data set through the input unit 110. The historic data set has login records of users during a period of time. For example, the historic data set includes the login records of User 1 and User 2 during a period of time between the date of 2018-05-4 and the date of 2018-05-27.

In the present embodiment, the historic data set includes a first data set and a second data set. Each data of the first data set has third labeling information, and the third labeling information is manually labeled on the behavior of the users, wherein types of the labels are, for example, normal and abnormal.

In step S420, the processing unit 130 inputs the first data set to the initial learning module 122 to obtain the initial labeling model 124. In the present embodiment, the initial learning module 122 trains the first data set by using a one class SVR algorithm, but the disclosure is not limited thereto. For example, in other embodiments, the training may be performed by using a semi-supervised learning algorithm, such as a self-training algorithm, a multi-view learning algorithm or the like.

In step S430, the processing unit 130 labels the second data set according to the initial labeling model 124 to generate the first labeling information of the second data set, and the labeled data set is the second data set with the first labeling information. Namely, a labeling source of the labeled data set is actually labelled through the initial labeling model 124, without consuming the manpower for the labeling.

It is to be mentioned that in an embodiment of the disclosure, each data of the historic data set further has login times of the users, and when establishing the initial labeling model 124 according to the first data set, the processing unit 130 further trains user behavior features in different time zones according to login models. For example, in the present embodiment, the processing unit 130 uses an hour as a time zone to compute data belonging to different times. Thus, according to a login time of each data of the second data set, the processing unit 130 finds out the time zone corresponding to the login time and the corresponding behavior feature in the initial labeling model 124 to label each data of the second data set, thereby generating the labeled data set. Similarly, the processing unit 130 determines the login time of each data of the verification data set and finds out the behavior feature of the labeling models 128 corresponding to the login time to label each data of the verification data set, thereby generating the second labeling information.

Figure 5:
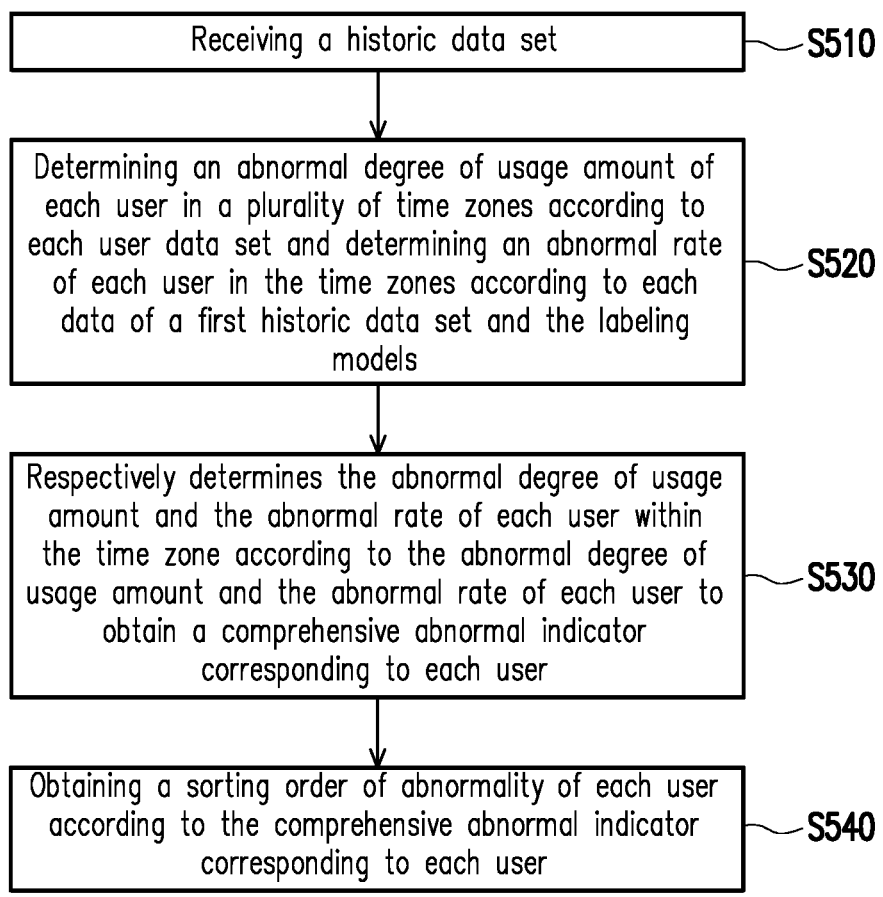
FIG. 5 is a flowchart illustrating a method of training behavior mode according to an embodiment of the disclosure.

FIG. 5 is a flowchart illustrating a method of training behavior mode according to an embodiment of the disclosure. Referring to FIG. 5, after establishing the labeling models 128, the processing unit 130 further analyzes login data of the users according to the labeling models 128, thereby finding out potential users with abnormal behavior.

Specifically, in step S510, the processing unit 130 receives the historic data set through the input unit 110. The historic data set refers to login data of the users during a period of time. Since each user may have multiple pieces of login data within a period of time, for easy understanding, a user data set is used for description. Namely, the login data of each user within this period of time is referred to as the user data set.

In step S520, the processing unit 130 determines an abnormal degree of usage amount of each user in a plurality of time zones according to each user data set and determines an abnormal rate of each user in the time zones according to each data of a historic data set and the labeling models.

For example, login conditions of User 1, User 2 and User 3 of the date of 06-04-2018 are taken for example for description. A user data set corresponding to User 1 includes 50 records, which indicates that User 1 logs in for 50 times. A user data set corresponding to User 2 includes 1 record, which indicates that User 2 logs in once. A user data set corresponding to User 3 includes 15 records, which indicates that User 3 logs in for 15 times. Accordingly, the processing unit 130 analyzes abnormal degrees of User 1, User 2 and User 3. In an embodiment of the disclosure, the processing unit 130 performs the analysis by using a principle of Formula (1) below, but the sequence and manner operated by the processing unit 130 are not limited in the disclosure.

$$\text{Abnormal degree} = \frac{|\text{Representative data amount of all users} - \text{Data amount used by one user}|}{\text{Data change degree of all users}} \quad (1)$$

In this case, the "Representative data amount of all users" is an average of the login times of all the users, i.e., 22. The "Data change degree of all users" is a standard deviation of the login times of all the users, i.e., 25.2389. The "Data amount used by one user" is the login times of each user, and the values as obtained vary with the users. In the present embodiment, the abnormal degrees of User 1, User 2 and User 3 are 1.1094, 0.8320 and 0.2773, respectively. A higher degree of a user represents that his/her use behavior during this period is much more different from most of the users.

In addition, the processing unit 130 further analyzes each of the user data sets by using the labeling models 128, thereby obtaining the abnormal rate of the users. For example, if the time in a day is divided into p use durations, the processing unit 130 predicts that each user has abnormal behavior during q use durations through the labeling models 128. In this circumstance, the processing unit 130 further obtains the abnormal rate of each user according to a principle of Formula (2), that is, determines how much the ratio of time each user has the abnormal behavior in a day. However, the sequence and manner operated by the processing unit 130 are not limited in the disclosure.

$$\text{Abnormal rate} = q/p \quad (2)$$

In step S530, the processing unit 130, respectively determines the abnormal degree of usage amount and the abnormal rate of each user within the time zone according to the abnormal degree of usage amount and the abnormal rate of each user to obtain a comprehensive abnormal indicator corresponding to each user. Specifically, in the present embodiment, the time zone is, for example, a week or a month, which is not limited herein. Namely, the processing unit 130 performs the abnormality analysis on the behavior of each user during a long period of time. Taking a week for example, if the processing unit 130 determines an abnormal degree of each user within a week according to the abnormal degree of usage amount and the abnormal rate, which is denoted by $S_{1,i}$, and $S_{1,i}$, i=1, 2, . . . , 7, an abnormal degree indicating the number of different internet addresses used by each user is denoted by $S_{2,i}$, and $S_{2,i}$, i=1, 2, . . . , 7. In this way, the processing unit 130 converts the abnormal degree of usage amount and the abnormal degree indicating the number of different internet addresses used by each user into $S_1'=\text{average}_{1\leq i\leq 7}(S_{1,i})$ and $S_2'=\max_{1\leq i\leq 7}(S_{2,i})$. Additionally, the processing unit 130, for example, further configures $S_1'$ and $S_2'$ with different weights and assigns each user with a comprehensive abnormal indicator, expressed by Formula (3).

$$\text{Comprehensive abnormal indicator} = w_1 \times S_1' + w_2 \times S_2' \quad (3)$$

In addition, following the case above, the processing unit 130 may also use a time zone which is a day, for example, to analyze the comprehensive abnormal indicator of each user, that is, microscopically observes whether the user's behavior is abnormal and generates the comprehensive abnormal indicator corresponding to the time zone. To be detailed, the processing unit 130 may further observe other abnormal indicators, for example, an abnormal degree corresponding to the number of different connection ports which are used, an abnormal indicator (e.g., an abnormal rate) corresponding to a period of use and so on. If the abnormal degree corresponding to the number of different connection ports which are used by the user in a day is $S_3$, and the abnormal indicator corresponding to the period of use is $ab_1$ (i.e., whether the user's behavior is abnormal during the period of use is predicted by using the labeling models 128). In this circumstance, the processing unit 130, for example, calculates a comprehensive abnormal indicator corresponding to a day, by Formula (4).

$$\text{Comprehensive abnormal indicator} = \text{average}(S_{2,1}, S_3, ab_1) \quad (4)$$

In case the comprehensive abnormal indicator increases, it represents that the user's behavior is much more different than others in that day.

In step S540, the processing unit 130 obtains a sorting order of abnormality of each user according to the comprehensive abnormal indicator corresponding to each user. After the comprehensive abnormal indicator is calculated for each user, the processing unit 130 further generates the sorting order of abnormality corresponding to each user according to the abnormal degree corresponding to each other for the manager's reference.

In light of the foregoing, the method and the system of training behavior labeling model of the disclosure can establish the labeling models to automatically label the users' login records. Moreover, in the consideration of the reliability of the labeling models, the method and the system of training behavior labeling model of the disclosure can simultaneously train various labeling models and label the users' login records in a majority decision manner when conflicts occurs to the labeled contents, so as to re-adjust and re-train labeling models. In this way, the method and the system of training behavior labeling model can contribute to enhancing the reliability of the labeling models. Meanwhile, through the labeling models, the users' login records can be automatically observed and analyzed, so as to further identify any possible abnormal login behavior. Accordingly, the method and the system of training behavior labeling model of the disclosure can not only reduce the manpower consumed for determining the abnormal login behavior, but also adopt more scientific analysis to reduce manually misjudged behavior, such that the abnormal login behavior of the in-house employees can be effectively monitored.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A system of training behavior labeling model, comprising:
    an input unit, receiving a labeled data set, wherein the labeled data set comprises a training data set and a verification data set, and each data of the training data set and each data of the verification data set respectively comprise first labeling information;

a storage unit, storing a plurality of learning modules;

a processing unit, connected to the input unit and the storage unit and respectively inputting each data of the training data set to the learning modules to establish a plurality of labeling models based on different supervised training algorithms, wherein the processing unit further obtains a plurality of second labeling information corresponding to each data of the verification data set respectively according to the labeling models and respectively generates a behavior labeling result corresponding to each data of the verification data set according to the second labeling information corresponding to each data of the verification data set, wherein the processing unit further obtains a labeling change value according to the behavior labeling result and the first labeling information corresponding to each data of the verification data set and determines whether the labeling change value is greater than a change threshold, and in response to that the labeling change value is greater than the change threshold, the processing unit updates the first labeling information corresponding to each data of the verification data set according to the behavior labeling results, exchanges the training data set and the verification data set and reestablishes the labeling models according to the exchanged training data set.

2. The system of training behavior labeling model according to claim 1, wherein the processing unit further stores the labeling models in the storage unit in response to that the labeling change value is not greater than the change threshold.

3. The system of training behavior labeling model according to claim 1, wherein the second labeling information corresponds to normal labels and abnormal labels, and the processing unit is further configured to determine the number belonging to the normal labels and the number belonging to the abnormal labels in the second labeling information corresponding to each data of the verification data set and generate the behavior labeling results according to the number belonging to the normal labels and the number belonging to the abnormal labels.

4. The system of training behavior labeling model according to claim 1, wherein the processing unit further execute operations of:
obtaining a first number, wherein the first number is a number of the data which the behavior labeling result and the first labeling information are normal in the verification data set,
obtaining a second number, wherein the second number is a number of the data which the behavior labeling result and the first labeling information are abnormal in the verification data set,
obtaining a measurement value of accuracy according to a ratio of a sum of the first number and the second number to a data amount of the verification data set,
obtaining a measurement value of specificity according to a ratio of the first number to the number of the first labeling information which is normal,
obtaining a measurement value of sensitivity according to a ratio of the second number to the number of the first labeling information which is abnormal, and
respectively determining difference values between the measurement value of accuracy, the measurement value of specificity and the measurement value of sensitivity and a historic measurement value of accuracy, a historic measurement value of specificity and a historic measurement value of sensitivity, so as to obtain the labeling change value.

5. The system of training behavior labeling model according to claim 1, wherein the input unit further receives a historic data set, wherein the historic data set comprises a first data set and a second data set, each data of the first data set comprises third labeling information,
wherein the processing unit further inputs the first data set to the initial learning module to obtain an initial labeling model and labels the second data set according to the initial labeling model to generate the first labeling information of the second data set, and the labeled data set is the second data set with the first labeling information.

6. The system of training behavior labeling model according to claim 5, wherein the initial labeling model and each of the labeling models respectively comprise behavior features corresponding to a plurality of time zones,
wherein the processing unit further finds out the corresponding behavior feature respectively according to a login time corresponding to each data of the second data set and the time zones in the initial labeling model and labels each data of the second data set according to the corresponding behavior feature to generate the labeled data set,
wherein the processing unit further finds out the corresponding behavior feature respectively according to a login time corresponding to each data of the verification data set and the time zones in the labeling model and labels each data of the verification data set according to the behavior feature to obtain the plurality of the second labeling information corresponding to each data of the verification data set.

7. The system of training behavior labeling model according to claim 1, wherein the input unit further receives a historic data set, wherein the historic data set comprises a user data set corresponding to each of a plurality of users,
wherein the processing unit further executes operations of:
determining an abnormal degree of usage amount of each of the users in the time zones respectively according to each of the user data sets and determining an abnormal rate of each user in the time zones according to each of the historic data sets and the labeling models,
respectively determining the abnormal degrees of usage amount and the abnormal rates of the users in the time zones according to the abnormal degree of usage amount and the abnormal rate of each of the users and obtaining a comprehensive abnormal indicator corresponding to each of the users, and
obtaining a sorting order of abnormality of each user according to the comprehensive abnormal indicator corresponding to each user.

8. A method of training behavior labeling model, comprising:
receiving a labeled data set, wherein the labeled data set comprises a training data set and a verification data set, and each data of the training data set and each data of the verification data set respectively comprise first labeling information;
respectively inputting each data of the training data set to a plurality of learning modules to establish a plurality of labeling models based on different supervised training algorithms;

respectively obtaining a plurality of second labeling information corresponding to each data of the verification data set according to the labeling models;

respectively generating a behavior labeling result corresponding to each data of the verification data set according to the second labeling information corresponding to each data of the verification data set;

obtaining a labeling change value according to the behavior labeling result and the first labeling information corresponding to each data of the verification data set and determining whether the labeling change value is greater than a change threshold; and in response to that the labeling change value is greater than the change threshold, updating the first labeling information corresponding to each data of the verification data set according to the behavior labeling results, exchanging the training data set and verification data set and reestablishing the labeling models according to the exchanged training data set.

9. The method of training behavior labeling model according to claim 8, further comprising:

in response to that the labeling change value is not greater than the change threshold, storing the labeling models.

10. The method of training behavior labeling model according to claim 8, wherein the second labeling information corresponds to normal labels and abnormal labels, and the method comprises:

determining the number belonging to the normal labels and the number belonging to the abnormal labels in the second labeling information corresponding to each data of the verification data set; and generating the behavior labeling results according to the number belonging to the normal labels and the number belonging to the abnormal labels.

11. The method of training behavior labeling model according to claim 8, wherein the step of obtaining the labeling change value according to the behavior labeling result and the first labeling information corresponding to each data of the verification data set further comprises:

obtaining a first number, wherein the first number is a number of the data which the behavior labeling result and the first labeling information are normal in the verification data set;

obtaining a second number, wherein the second number is a number of the data which the behavior labeling result and the first labeling information are abnormal in the verification data set;

obtaining a measurement value of accuracy according to a ratio of a sum of the first number and the second number to a data amount of the verification data set;

obtaining a measurement value of specificity according to a ratio of the first number to the number of the first labeling information which is normal;

obtaining a measurement value of sensitivity according to a ratio of the second number to the number of the first labeling information which is abnormal; and respectively determining difference values between the measurement value of accuracy, the measurement value of specificity and the measurement value of sensitivity and a historic measurement value of accuracy, a historic measurement value of specificity and a historic measurement value of sensitivity, so as to obtain the labeling change value.

12. The method of training behavior labeling model according to claim 8, further comprising:

receiving a historic data set, wherein the historic data set comprises a first data set and a second data set, each data of the first data set comprises third labeling information;

inputting the first data set to the initial learning module to obtain an initial labeling model; and labeling the second data set according to the initial labeling model to generate the first labeling information of the second data set, and the labeled data set is the second data set with the first labeling information.

13. The method of training behavior labeling model according to claim 12, wherein the initial labeling model and each of the labeling models respectively comprise behavior features corresponding to a plurality of time zones, and the method further comprises:

finding out the corresponding behavior feature respectively according to a login time corresponding to each data of the second data set and the time zones in the initial labeling model and labeling each data of the second data set according to the corresponding behavior feature to generate the labeled data set;

finding out the corresponding behavior feature respectively according to a login time corresponding to each data of the verification data set and the time zones in the labeling model and labeling each data of the verification data set according to the behavior feature to obtain the plurality of the second labeling information corresponding to each data of the verification data set.

14. The method of training behavior labeling model according to claim 8, further comprises:

receiving a historic data set, wherein the historic data set comprises a user data set corresponding to each of a plurality of users;

determining an abnormal degree of usage amount of each of the users in the time zones respectively according to each of the user data sets and determining an abnormal rate of each user in the time zones according to each of the historic data sets and the labeling models;

respectively determining the abnormal degrees of usage amount and the abnormal rates of the users in the time zones according to the abnormal degree of usage amount and the abnormal rate of each of the users and obtaining a comprehensive abnormal indicator corresponding to each of the users, and obtaining a sorting order of abnormality of each user according to the comprehensive abnormal indicator corresponding to each user.

* * * * *